United States Patent [19]
Dodge et al.

[11] Patent Number: 5,845,839
[45] Date of Patent: Dec. 8, 1998

[54] METHOD AND APPARATUS FOR DIP SOLDER PROCESSING

[75] Inventors: Thomas Dale Dodge, Anderson; Ronald Dale Gentry, Cicero, both of Ind.

[73] Assignee: General Motors Corporation, Detroit, Mich.

[21] Appl. No.: 770,106

[22] Filed: Dec. 19, 1996

[51] Int. Cl.⁶ ............................... H05K 3/34; B23K 1/08
[52] U.S. Cl. .......................... 228/259; 228/36; 228/56.2; 118/421; 118/422; 427/431
[58] Field of Search ............... 228/34, 36, 56.2, 228/256, 259; 118/421, 422; 427/431

[56] References Cited

U.S. PATENT DOCUMENTS

| | | |
|---|---|---|
| 3,570,741 | 3/1971 | Corsaro ....................... 228/40 |
| 3,738,312 | 6/1973 | Padjen et al. ............... 118/421 |
| 3,779,056 | 12/1973 | Padjen et al. ............... 427/431 |
| 4,113,165 | 9/1978 | Ott ............................... 228/36 |
| 5,087,356 | 2/1992 | Webb ......................... 210/143 |
| 5,192,014 | 3/1993 | Ciniglio et al. ............. 228/34 |
| 5,372,293 | 12/1994 | Corlay et al. ............... 228/36 |

*Primary Examiner*—Patrick Ryan
*Assistant Examiner*—Jeffrey T. Knapp
*Attorney, Agent, or Firm*—Vincent A. Cichosz

[57] ABSTRACT

A dip soldering process includes a reservoir of molten solder and a solder ladle for immersion therein to refresh the supply of ladled solder. The ladled solder is displaced by a displacement plunger to thereby overflow the ladle and carry with it surface contamination. Continued immersion of the plunger during the soldering operation of the workpiece accomplishes continual flow across the soldered workpiece thereby removing any contaminants which rise to the surface or are introduced by the workpiece.

9 Claims, 2 Drawing Sheets

METHOD AND APPARATUS FOR DIP SOLDER PROCESSING

TECHNICAL FIELD

The present invention is related to the field of molten dip solder processing of electrical components.

BACKGROUND OF THE INVENTION

Dip soldering is a technique generally used for soldering of wires, terminals or other terminations or leads in electrical and electronic components and assemblies. Generally, a bath of molten solder is maintained in a liquid state in a heated vessel. Work pieces are automatically and controllably lowered in a predetermined orientation into the solder bath to effectuate the desired electrical and mechanical connections afforded by a solder joint. Commonly, a ladle having a significantly smaller volume than the vessel is automatically and controllably plunged into the molten solder and raised up toward the workpiece. The ladle may then continue to be raised such that contact is made with the desired portions of the prepositioned workpiece, or the ladle comes to rest and the workpiece is automatically and controllably lowered in a predetermined orientation into the ladled solder to effectuate the desired electrical and mechanical connections afforded by a solder joint.

Oxides and other contaminants in the solder bath generally known as dross have the tendency to congregate upon the surface of the molten solder. The dross is transferred to the quantity of solder in the ladle also. This presents problems in as much as such contamination may interfere with proper solder application an adhesion to the workpiece. Therefore, any type of contamination on the surface of the molten solder and transferred to the workpiece solder joint is undesirable.

Various techniques have been proposed for removal of such contaminants from the solder bath and/or quantity of ladled solder. One such approach includes some type of mechanical skimming apparatus for scraping the surface of the dross contaminated solder from the vessel or the ladle. After skimming, the workpiece is then contacted with the solder bath. Such apparatus and approach suffers from the drawback that new contaminants from the workpiece, such as from insulation around leads being soldered, may collect on the surface of the solder during the solder operation and interfere with and contaminate the solder joint. Additionally, apparatus employing such skimming devices tend to require relatively tight control of solder levels in order that the skimming interface appropriately contact the surface of the solder.

An alternative apparatus and approach addressing the problem with dross contamination of solder utilizes a mechanical solder pump submerged in the solder vessel and effective to develop a fountain of molten solder which is delivered to the workpiece. Minimal dross contaminants are transferred to the workpiece as the working solder is not drawn from the surface of the solder. However, such systems tend to be relatively expensive and maintenance intensive. Additionally, limitations on solder control and coverage may make such systems undesirable.

Yet another proposed solution addressing the solder contamination problem associated with dip solder processes utilizes a gravity feed system incorporated in to a ladle. Generally, a ladle having two solder chambers open at the respective tops and coupled by way of a oriented at the base of the two solder chambers is used in a ladle type solder operation. One of the two solder chambers is used as the workpiece solder chamber for contacting the workpiece while the other of the two solder chambers is used as a solder reservoir flow source. The flow source solder chamber has its respective opening at a slightly higher vertical displacement relative to the opening of the workpiece solder chamber. As the ladle is retrieved from the solder vessel, a very short duration flow of solder occurs out of the top of the workpiece chamber as the two chambers settle to an equilibrium level. The temporal nature of the solder flow allows additional contaminants to again collect on the surface of the solder in the workpiece solder chamber. Additionally, the geometry of such a ladle may interfere with certain workpiece arrangements thereby undesirably limiting the process flexibility of the soldering apparatus. Also, as with the skimming apparatus and approach, the dual chamber ladle apparatus and approach suffers from the drawback that new contaminants from the workpiece, such as from insulation around leads being soldered, may collect on the surface of the solder during the solder operation and interfere with and contaminate the solder joint.

SUMMARY OF THE INVENTION

Therefore, it is an object of the present invention to provide for improved dross removal in a dip solder process.

It is further an object to provide such an improved process that will continuously remove solder contaminants throughout the dip solder processing of a workpiece.

In accordance with these objects, a dip solder process includes a solder vessel providing a reservoir of molten solder. A working ladle is controlled to immerse in the vessel and retrieve a quantity of molten solder. The ladle is raised to a predetermined level whereat a displacement plunger is controllably immersed into the ladled solder to raise the level of solder beyond the ladle edges such that the surface contaminants drop over the sides and into the vessel. Contemporaneous with the solder displacement or shortly after removal of the surface contaminants the workpiece is brought into the desired contact with the ladled solder. The displacement plunger may continue to be immersed into the ladled solder such that a continuous flow of solder out of the ladle is maintained to keep the surface contaminants away from the workpiece.

In accordance with a preferred embodiment of the invention, the attainment of a predetermined position such as a fully extended position of the ladle initiates the plunger displacement of the ladled solder. Preferably, the workpiece is brought into contact with the ladled solder after the immersion of the plunger has removed the surface contaminants. The actuation of the plunger may, for example, be by way of a pneumatic cylinder and control valve for controlling the direction and rate of travel of the plunger.

In certain dip solder operations wherein the workpiece may demand extended solder durations, alternative ladle and/or plunger geometries may provide for the required flow durations and rates in accordance with the desired objectives.

BRIEF DESCRIPTION OF THE DRAWINGS

The present invention will now be described, by way of example, with reference to the accompanying drawings, in which.

DESCRIPTION OF THE PREFERRED EMBODIMENT

Figure 1:
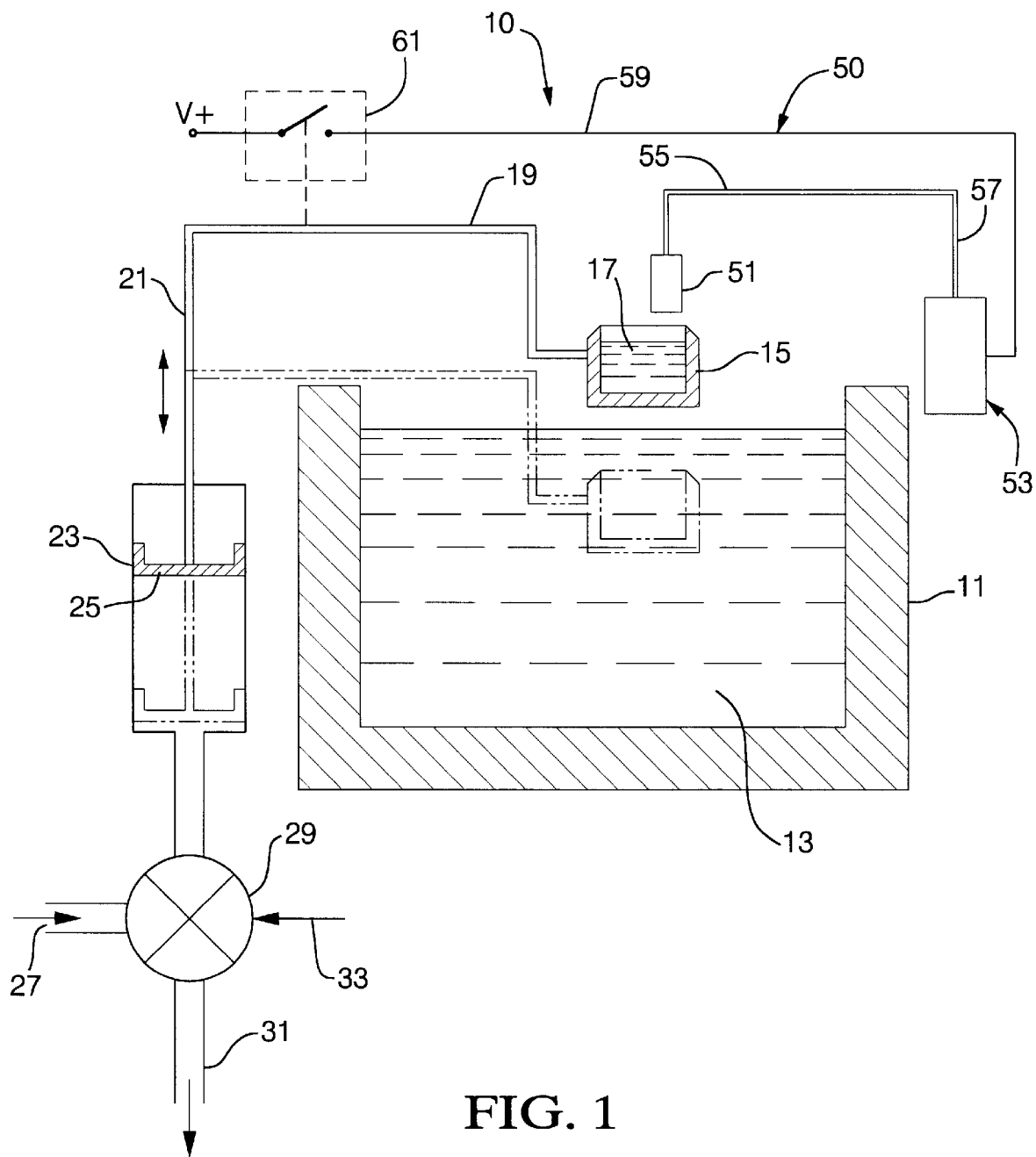
FIG. 1 is a schematic diagram of a ladle solder apparatus in accordance with the invention.

With reference now to the various figures, a ladle dip solder apparatus is generally designated by the numeral 10. The dip solder apparatus includes a solder vessel 11 which is heated in a controlled fashion to maintain a volume of solder 13 in a molten state generally within a predetermined temperature range in accordance with the solder composition and workpiece requirements. The vessel may itself be heated or may have disposed therein a heating apparatus such as an electrically resistive heating element for maintaining the solder in the desired molten state. A ladle designated 15 in the figures is shown in a fully retracted position relative to the vessel 11. The ladle 15 contains a volume of molten solder 17 which is refreshed when the ladle is submerged below the surface of the molten solder 13 contained in the vessel 11. The ladle 15 is also illustrated in the submerged position by broken lines. Ladle arm 19 couples the ladle 15 to a displacement arm 21. Displacement arm 21 is free to move vertically as illustrated in the figure by the double ended arrow adjacent thereto. Displacement arm 21 is part of a displacement mechanism which in the present exemplary embodiment includes a pneumatic cylinder 23 including pneumatic plunger 25 connected to displacement arm 21 for transmitting pneumatic plunger motion to the displacement arm. Pneumatic plunger 25 is illustrated by solid lines in the figure in a full up position corresponding to the fully retracted position of the ladle 15. Pneumatic plunger 25 is also illustrated by broken lines in the figure in a full down position corresponding to the submerged position of the ladle 15.

Pneumatic cylinder is coupled to a pressurized air supply 27 through control valve 29. Control valve 29 is a two position solenoid actuated pneumatic valve which in an energized state couples the air supply 27 to a working chamber of the cylinder 23 and blocks flow to an exhaust port 31. In a deenergized state, the control valve 29 couples the air supply 27 and the working chamber of the cylinder 23 to the exhaust port 31. With the supply valve energized, pneumatic plunger 25 is forced up to raise the ladle 15. The pneumatic plunger or displacement arm may provide travel limit through interference with predetermined stops (not shown) to define the submerged and retracted positions of the ladle 15. Control valve 29 is responsive to a control signal on line 33. In accord with the present embodiment, the control signal is a binary signal such as a switched voltage source which is effective to place the control valve 29 into one of the two described states. Such control signal may be provided from a single output channel driver of a conventional programmable controller (not shown) used extensively in controlling process machine apparatus and well known to those having ordinary skill in the art.

In accordance with a preferred embodiment of the present invention, a solder displacement apparatus generally designated by the numeral 50 in the figures includes a displacement plunger 51 coupled to a displacement actuator 53 by way of plunger arm 55 and displacement arm 57. The displacement plunger 51 is oriented such that the ladle 15 is directly below. The displacement actuator 53 is operative to move the displacement arm, and hence the plunger arm 55 and displacement plunger 51 vertically as indicated by the double ended arrow in FIG. 2. The displacement plunger 51 is preferably moved from a fully retracted position illustrated by the broken lines in FIG. 2 to a fully submerged position illustrated by the solid lines in FIG. 2. In the fully retracted position, the plunger is located above and not in contact with the molten solder 17 within the ladle 15 including for the fully retracted position of the ladle 15. In the fully submerged position, the plunger is located at least partially within the molten solder 17 within the ladle 15. The ladle 15 is desirably raised out of the solder 13 of vessel 11 and reaches a fully retracted position. Upon the ladle reaching the fully retracted position, displacement plunger 51 is progressively moved by displacement actuator 53 at a controlled rate to its fully submerged position. A workpiece (not shown) is conveyed to a predetermined position proximate the ladle opening in a conventional fashion to complete the desired solder joint(s) by placing the desired portions of the workpiece in contact with the molten solder 17. Actuator 53 may be activated, for example, by an actuator control signal coupled to the actuator 53 by way of line 59. Line 59 in turn may be enabled and disabled by the ladle displacement arm or ladle arm reaching a predetermined position, such as substantially the fully retracted position, as indicated by the schematic switch 61. In the example, switch 61 is normally closed coupling the actuator control signal to actuator 53 until the ladle is substantially in the fully retracted position whereat the switch 61 is opened and the actuator control signal is decoupled from the actuator 53.

Figure 2:
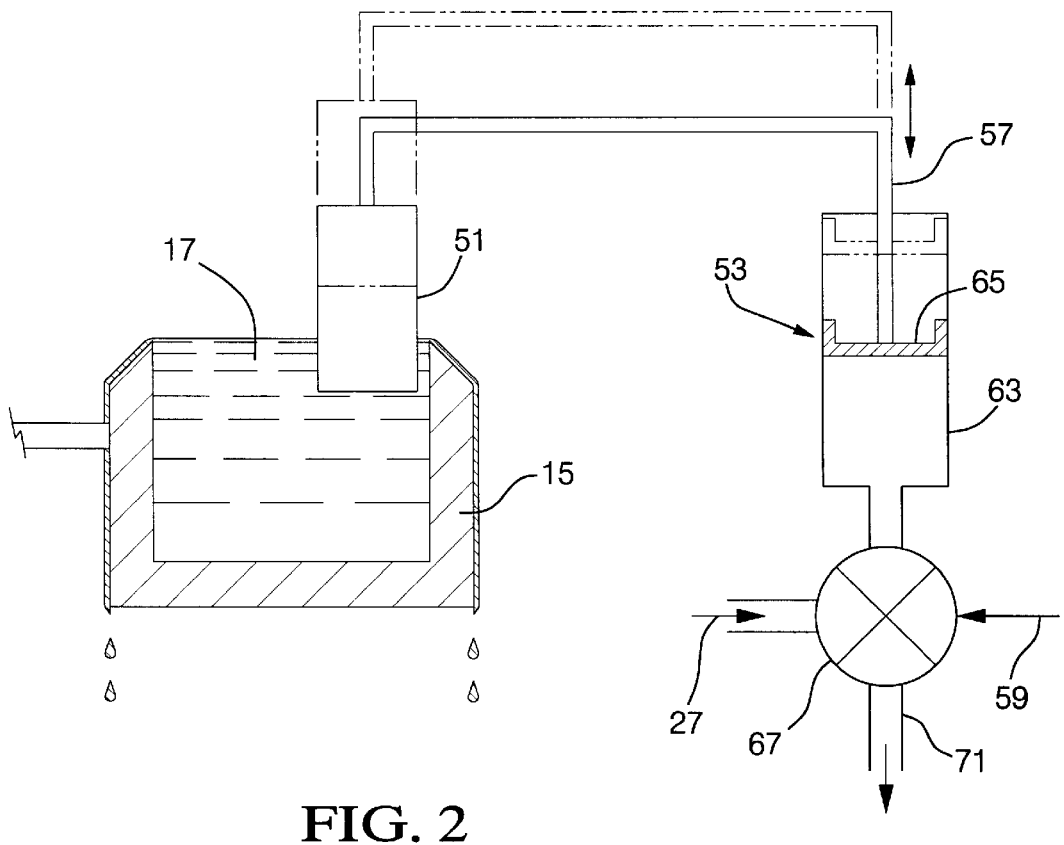
FIG. 2 is a detailed schematic showing a preferred implementation of solder flow in accord with the present invention; and, FIG. 3 is a detailed schematic of an alternative ladle configuration for application to the invention.

With reference now specifically to FIG. 2, a preferred mechanization for the actuator 53 is illustrated. A pneumatic cylinder 63 including pneumatic plunger 65 is connected to displacement arm 57 for transmitting pneumatic plunger motion to the displacement arm. Pneumatic plunger 65 is illustrated by solid lines in the figure in a mid-travel position corresponding to a partially submerged position of displacement plunger 51 in the molten solder 17 of ladle 15. Pneumatic plunger 65 is also illustrated by broken lines in the figure in a full up position corresponding to the fully retracted position of the displacement plunger 51.

Pneumatic cylinder 63 is coupled to pressurized air supply 27 through control valve 67. Control valve 67 is a two position solenoid actuated pneumatic valve which in an energized state couples the air supply 27 to a working chamber of the cylinder 63 and blocks flow to an exhaust port 71. Exhaust port may include a flow restriction orifice sized for exhausting the working chamber of cylinder 63 at a rate determined in accordance with the flow restriction orifice. In a deenergized state, the control valve 67 blocks the air supply 27 and couples the working chamber of the cylinder 63 to the exhaust port 71. With the supply valve energized, pneumatic plunger 65 is forced up to raise the ladle 17. The pneumatic plunger 65 or displacement arm 57 may provide travel limit through interference with predetermined stops to define the fully submerged and fully retracted positions of the displacement plunger 51. Control valve 67 is responsive to the actuator control signal on line 59. In accord with the present embodiment, the control signal is a binary signal such as a continuous voltage source V+ which is effective to place the control valve 67 into one of the two described states in accord with the state of switch 61. Such control signal may be provided from a conventional regulated voltage source. Switch 61 may be a simple normally closed mechanically actuated switch, a normally closed magnetically responsive reed switch, normally closed optical switch or other type of normally closed proximity or position switch adapted for detection of desired position of the ladle.

Alternatively, the control signal on line 59 may be taken from a single voltage output channel of conventional programmable controller associated with the control of the process functions of the solder operation. In this way, the switch 61 may be eliminated in favor of sequential control of the ladle retraction from the vessel followed by control of the displacement plunger immersion into the ladle. One or both of the control valves 29 and 67 may be any of a variety of pulse width modulation controlled valves effective to control the pneumatic pressure in the respective working chambers of the cylinders with the respective control signals being pulse width modulated signals controlled in accord with a predetermined pulse width modulation schedule to control the rate of displacement of the respective pneumatic plungers. The controlled displacement functions of one or both of pneumatic cylinders 23 and 63 may be provided for by linear motor drive units, shaft driven cams or any other suitable drive mechanization.

Accordingly, the present embodiment of the invention as illustrated and described refreshes the ladle 15 by immersion into the molten solder of vessel 11 whereafter it is retracted from the vessel and positioned at a predetermined orientation above the vessel 11. The molten solder 17 within the ladle 15 finds an equilibrium level substantially even with the opening in the top of the ladle 15. The displacement plunger and workpiece are brought to the surface of the solder 17. Preferably, the displacement plunger precedes the contact of the workpiece with the solder 17 such that the solder level rises beyond a sustainable level by breaking the surface tension of the solder surface thereby removing the dross contaminants by flowing the contaminants over the edges of the ladle 15. For certain soldering operations, the surface dross removal may be complete at this point and continued displacement plunger 51 immersion halted, followed by the workpiece dip into the now cleaned solder 17 of ladle 15. However, according to a preferred implementation, the displacement plunger 51 continues to be further immersed into the solder 17 as the dip solder operation of the workpiece is ongoing. Continued immersion of the displacement plunger during the soldering operation advantageously continuously flows preexisting contaminants which surface from the solder 17 and new contaminants from the workpiece introduced to the solder 17 over the edges of the ladle 15.

Figure 3:
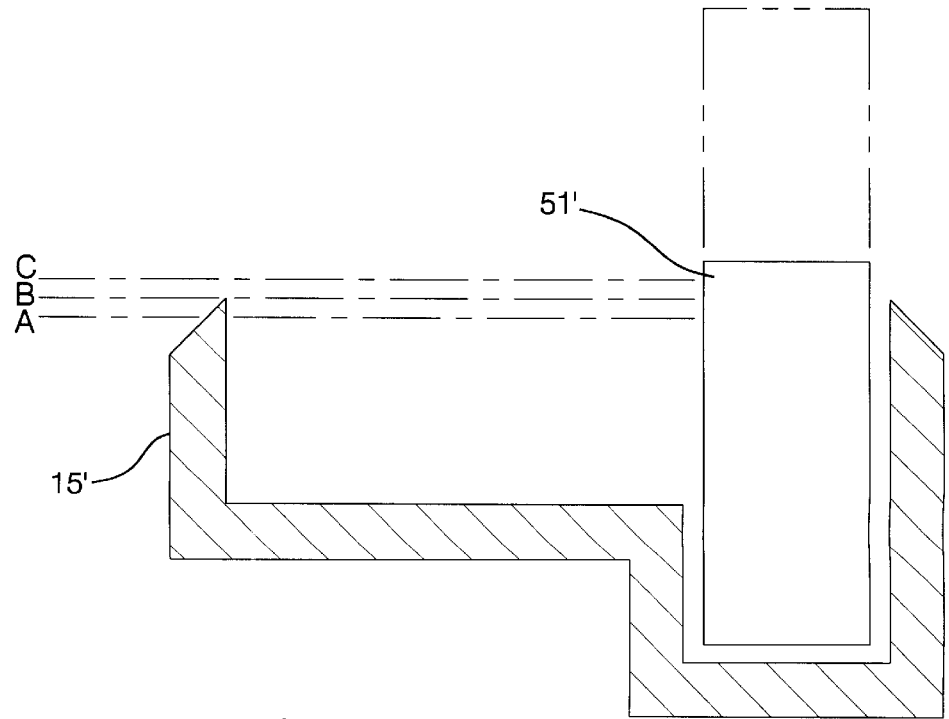

With reference to FIG. 3, an alternative "deep well" ladle 15' and complementary displacement plunger 51' are illustrated. During certain dip solder operations, for example ones requiring relatively lengthy workpiece immersions due to substantial thermal masses of the workpiece, the total amount of displacement plunger travel may be limited by the limited depth of the ladle. Therefore, one manner of addressing the need for extending the solder displacement and hence solder flow across the dipped workpiece is to increase the depth of the ladle at least locally to accommodate a greater stroke of the plunger. In some case, it may not be possible or practical to slow the rate of plunger stroke to extend the displacement duration. In fact, for a given cross sectional area of plunger, merely retarding the stroke rate to increase the stroke duration may adversely affect the dross removal due to the proportional decrease in solder flow across the dipped portion of the workpiece.

Various solder levels are represented by the broken lines labeled A, B, and C in the figure. During the portion of ladle travel out of the solder vessel through its final resting position for the dip solder operation, the solder level in the ladle may be reduced to a level below one or more of the edges of the ladle, such as the level labeled A in the figure. This is due to the motion of the ladle and disruption of the solder therein which may cause loss of solder from the ladle. Also, as the solder finds its level in the ladle, the lowest point on the rim of the ladle will define the equilibrium level which may in fact be below certain portions of the rim. In any event, the solder level in the ladle is generally going to be limited to the rim level of the ladle labeled B in the figure since the surface tension of the solder in the vessel during removal of the ladle out of the vessel tends to negative the establishment of any significant meniscus beyond the edges of the ladle. Either of the two solder levels labeled A and B restrict the workpiece access to the solder bath due to potential interference of the workpiece with the sidewalls of the ladle. The present invention through the continuous displacement of the solder in the ladle during the solder process maintains a level of solder slightly above the rim level as illustrated in the figure as level A. This allows for improved access to the solder in the ladle by the workpiece without the disadvantages of interference with the ladle rim.

It has been assumed to this point that the plunger in a dip solder displacement apparatus has a substantially consistent cross section at all insertion depths. However, it is envisioned by the inventors that alternative plunger geometries may be employed for achieving special effects with respect to the dross removal functions of the invention. For example, a plunger immersed at a constant rate having a larger cross section at the distal end which is first in contact with the solder relative to a smaller cross section of the remainder of the plunger may advantageously provide a rapid meniscus build up and surface tension break for quick removal of surface contaminants prior to workpiece insertion into the ladled solder followed by a slower displacement and solder flow adequate to keep the solder surface contaminant free during the remainder of the dip solder process duration.

While the present invention has been disclosed with respect to certain preferred embodiments, it is envisioned that various alternatives may be apparent to those exercising ordinary skill in the art. Therefore, the exemplary embodiments described herein are to be taken by way of illustration, the scope of the invention being limited only by the claims as hereafter presented.

We claim:

1. A dip solder apparatus comprising:

a reservoir of molten solder;

a solder ladle operatively coupled to a ladle positioning apparatus adapted to move said ladle between a submerged position in said reservoir of molten solder to provide a refreshed working volume of molten solder within the ladle and a retracted position generally above the reservoir of molten solder whereat dip soldering of a workpiece occurs;

a displacement plunger operatively coupled to a plunger positioning apparatus adapted to move said displacement plunger between a retracted position generally above the ladle and an immersed position within said working volume of molten solder within the ladle; and a ladle position detection apparatus operatively coupled to said plunger positioning apparatus to cause said displacement plunger to move from the respective retracted position to the immersed position when said ladle is in the respective retracted position, and to move from the immersed position to the respective retracted position when said ladle is not in the respective retracted position.

2. A dip solder apparatus as claimed in claim 1 wherein said plunger positioning apparatus comprises a pneumatic cylinder and a solenoid operated valve having first and second solenoid positions operatively coupling a working chamber of said pneumatic cylinder to a supply pressure and an exhaust pressure, respectively, said ladle position detection apparatus comprising a switch operatively coupled to said ladle and having first and second switch positions corresponding to said ladle not being in said respective retracted position and being in said respective retracted position, respectively, and said first switch position providing a first voltage state to said solenoid operated valve to effectuate said first solenoid position said second switch position providing a second voltage state to said solenoid operated valve to effectuate said second solenoid position.

3. A method of dip soldering a workpiece in a ladled volume of molten solder comprising the steps:

providing a substantially full ladle of molten solder to a static soldering position;

stroking a displacement plunger into the molten solder to thereby raise the level of molten solder over at least the lowest edge of the ladle until a predetermined volume of molten solder overflows the ladle; and immersing a solder workpiece into the molten solder.

4. The method of dip soldering a workpiece in a ladled volume of molten solder as claimed in claim 3 further comprising the step:

continuing stroking the displacement plunger into the molten solder after the predetermined volume of molten solder overflows the ladle and while immersing the solder workpiece into the molten solder to thereby continue the molten solder overflow.

5. The method of dip soldering a workpiece in a ladled volume of molten solder as claimed in claim 3 wherein the step of providing a substantially full ladle of molten solder to a static soldering position further comprises the steps:

submerging the ladle into a reservoir of molten solder; and retracting the ladle from the reservoir of molten solder to the static soldering position substantially above the reservoir of molten solder.

6. A dip solder apparatus comprising:

a reservoir of molten solder;

a solder ladle controllably moved from a submerged position in said reservoir of molten solder to provide a refreshed working volume of molten solder within the ladle to a retracted position generally removed from the reservoir of molten solder whereat dip soldering of a workpiece occurs; and a displacement plunger controllably stroked from a retracted position remote from the working volume of molten solder when said solder ladle is substantially at said retracted position to an immersed position within said working volume of molten solder within the ladle to thereby expel a predetermined volume of molten solder from said ladle.

7. A dip solder apparatus as claimed in claim 6 wherein said displacement plunger is adapted to attain said immersed position prior to dip soldering of said workpiece.

8. A dip solder apparatus as claimed in claim 6 wherein said displacement plunger is adapted to controllably stroke through to said immersed position during dip soldering of said workpiece whereby said predetermined volume of molten solder is expelled during said dip soldering.

9. A dip solder apparatus as claimed in claim 8 wherein said ladle is characterized by a first depth generally beneath an insertion area accommodating said workpiece and a second depth generally beneath an insertion area accommodating said displacement plunger and deeper than said first depth, said immersed position of said displacement plunger being below said first depth.

* * * * *